United States Patent [19]
Greenspan

[11] 3,881,705
[45] May 6, 1975

[54] BLENDER ADAPTOR

[76] Inventor: Robert P. Greenspan, P.O. Box 112, Huntingdon Valley, Pa. 19006

[22] Filed: June 20, 1973

[21] Appl. No.: 371,894

[52] U.S. Cl. ................................ 259/108; 259/107
[51] Int. Cl. ............................................. B01p 8/1
[58] Field of Search ............ 259/108; 285/177, 176; 4/256

[56] References Cited
UNITED STATES PATENTS

| | | | |
|---|---|---|---|
| 1,708,736 | 4/1929 | Pallady | 285/177 X |
| 1,987,366 | 1/1935 | Ford | 285/177 X |
| 2,053,943 | 9/1936 | Carlson | 285/177 X |
| 2,102,072 | 12/1937 | Hinderliter | 285/177 X |
| 3,493,215 | 2/1970 | Edwards et al. | 259/108 |
| 3,603,364 | 9/1971 | Samuelian | 259/108 X |
| 3,738,616 | 6/1973 | Copeland | 259/108 |

FOREIGN PATENTS OR APPLICATIONS

| | | | |
|---|---|---|---|
| 779,948 | 7/1957 | United Kingdom | 285/177 |
| 432,152 | 9/1967 | Switzerland | 285/177 |

*Primary Examiner*—Harvey C. Hornsby
*Assistant Examiner*—Donald B. Massenberg
*Attorney, Agent, or Firm*—Weiser, Stapler & Spivak

[57] ABSTRACT

A blender adaptor suitable to adapt containers of various sizes for use with conventional blenders. The adaptor comprises an annular adaptor ring having external threads of suitable pitch and diameter to engage within the blender jar retainer threads in a leakproof manner and with the revolving cutting blade concentrically positioned. The adaptor ring is machined with interior threads with suitable size and pitch to receive a bottle of relatively small capacity in a mechanically secure and leakproof manner.

4 Claims, 4 Drawing Figures

PATENTED MAY 6 1975 3,881,705
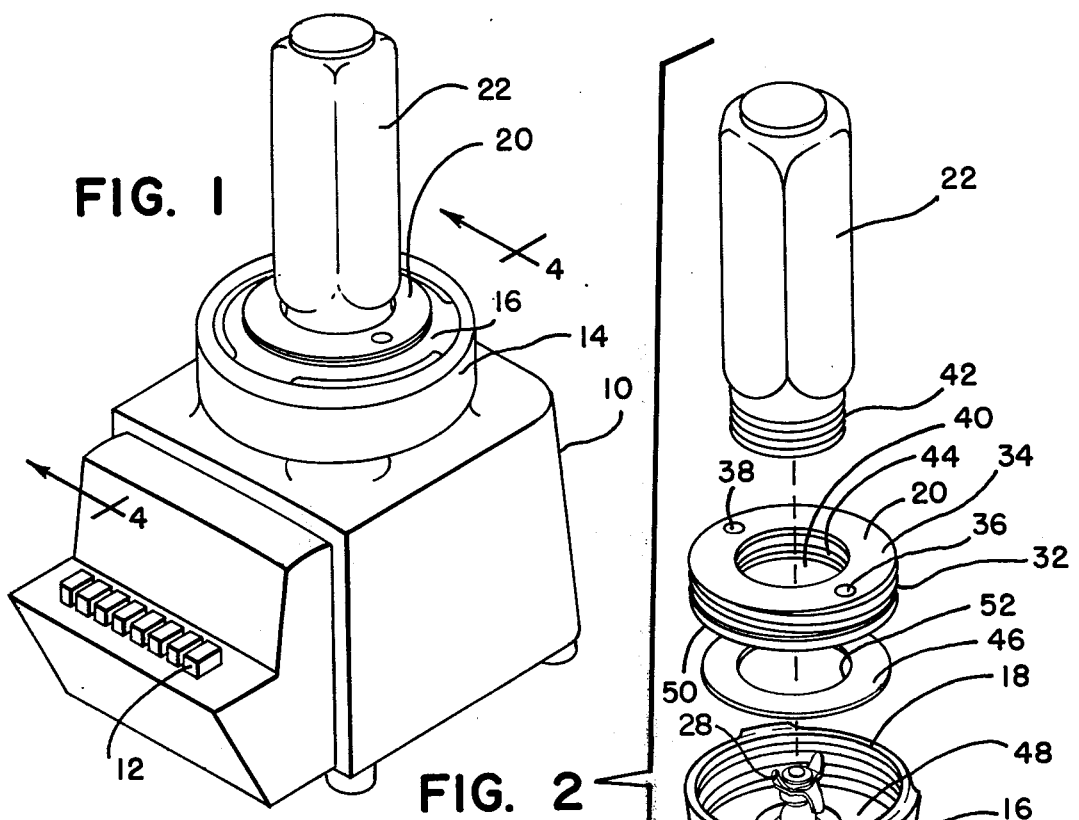
FIG. 1
FIG. 2
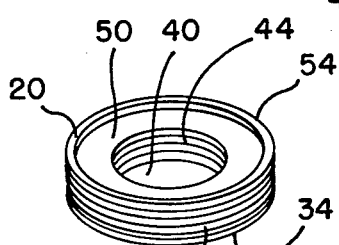
FIG. 4
FIG. 3

3,881,705

BLENDER ADAPTOR

BACKGROUND OF THE INVENTION

The present invention relates generally to the field of food chopping appliances, and more particularly, is directed to a blender adaptor for use with small containers having small outlet neck diameters.

Conventional food blenders have been designed for household use and many well made and competing products are presently available for home use. All of the prior art type of blenders incorporate a stable base containing a motor which rotates a vertically oriented spindle. The spindle is associated with a food chopping blade and means are provided to retain a largemouthed food container in leakproof association with the blender base in a manner to direct the food to be blended to the vicinity of the rotary blade. The devices presently on the market generally incorporate food containers in the range of one quart size to one gallon size to provide adequate quantities of blended food for family use, for families of various numbers of members.

Due to the availability of the household type of blender and its proven reliability in operation, such equipment has become increasingly more important in laboratory use for chopping and blending relatively small amounts of material. In many instances of laboratory use, the relatively large one quart to one gallon size food containers have proved entirely unsatisfactory for laboratory purposes in that usually, only minute quantities of material need be blended for a particular study. Because of the relatively small quantity of material in use, the available large food containers, such as the one quart sizes which are usually supplied with the blender are generally not suitable for the puspose. Accordingly, it has long been desirable to provide a reliable, readily available and inexpensive blender for laboratory use with facilities incorporated to render the device suitable for blending small amounts of material.

SUMMARY OF THE INVENTION

The present invention relates to a blender adaptor, and more particularly, is directed to a ring type adaptor suitable to convert a conventional household blender for laboratory use.

The present invention incorporates an annular, metallic or plastic adaptor ring which is provided with external threads suitable to engage within the existing threads of the jar mounting attachment in a manner to position the blender blade interiorly of the adaptor.

The adaptor ring is fabricated of sufficient annular thickness to define a concentric circular opening to receive a conventional bacteriological dilution bottle or a conventional four ounce baby bottle thereon. The concentric opening is interiorly threaded to engage the usual threads of the dilution bottle or the four ounce baby bottle in a structurally sound, leakproof manner. A gasket interfits between the adaptor and the floor of the jar mounting attachment to prevent leakage thereabout during the food chopping or blending operation. Preferably, the bottom of the adaptor is machined to provide a depending flange which peripherally squeezes the gasket for additional sealing function.

It is therefore an object of the present invention to provide an improved blender adaptor of the type set forth.

It is another object of the present invention to provide a novel blender adaptor suitable to convert a household type of food blender for laboratory use.

It is another object of the present invention to provide a novel blender adaptor which is suitable to adapt a conventional household blender base for use with small bottles such as bacteriological dilution bottles or four ounce baby bottles.

It is another object of the present invention to provide a novel blender adaptor in the form of an annular ring having external threads to threadedly engage the jar threads of jar mounting attachments and which is further equipped with interior threads to threadedly engage the threads at the neck of small bottles for laboratory use.

It is a further object of the present invention to provide a novel blender adaptor that is shaped in the form of an annular ring to define an outer periphery and a concentric, central opening, the outer periphery being machined to provide external threads suitable to engage the threads of a blender base and the concentric opening being machined with interior threads to threadedly engage the neck of a mini container.

It is another object of the present invention to provide a novel blender adaptor in the form of an interiorly threaded and exteriorly threaded annular ring with depending peripheral flange means to prevent leakage.

It is another object of the present invention to provide a novel blender adaptor that is rugged in construction, inexpensive in manufacture and trouble free when in operation.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of a blender equipped with the blender adaptor of the present invention.

FIG. 2 is an exploded, perspective view of the parts of FIG. 1.

FIG. 3 is a bottom, perspective view of the blender adaptor of the present invention.

FIG. 4. is an enlarged, partial view, partly in section and partly broken away, taken along Line 4—4 of FIG. 1, looking in the direction of the arrows.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1 a blender base 10 of conventional design having the usual speed control buttons 12 to regulate the speed of rotation of the blender blade 28. The blender base 10 terminates upwardly in a mounting ring 14 which is inwardly finished to receive a usual jar mounting attachment 16 in conventional manner in readily removable engagement. The jar mounting attachment 16 contains conventional internal threads 18 of suitable size to receive the threaded neck of a usual 1 quart or 1 gallon food container (not shown) in threaded engagement. An annular adaptor ring 20 which is constructed in the manner hereinafter more fully set forth threadedly engages the internal threads 18 of the jar mounting attachment 16 for mini bottle connection purposes. The adaptor ring 20 is fabricated to concentrically mount a bacteriological dilution bottle 22 of conventional design. Optionally, the adaptor ring 22 may be sized to fit a conventional four ounce baby bottle in the same manner for the same purpose.

Referring now to FIGS. 2 and 3, I show the jar mounting attachment 16 provided with a plurality of peripherally spaced, frictional, engaging lugs 24 of suitable size and shape to engage within the interior periphery 26 of the blender mounting ring 14. The jar mounting attachment 16 concentrically carries the rotary blade 28 and precisely positions the blade over the blender motor driven stud 30 to removably connect the blade 28 to the blender base 10. In this manner, when the motor driven stud 30 is rotated by action of the speed control buttons 12, the rotary blade 28 will be upwardly rotated for blending purposes.

The adaptor ring 20 is generally cylindrically formed to the configuration of an annular ring and is provided with external threads 32 of diameter and pitch to threadedly engage the internal threads 18 of the jar mounting attachment 16 in a structurally secure, leakproof manner. Preferably, the top surface 34 is provided with a pair of diametrically opposed recesses 36, 38 to accommodate a spanner wrench (not shown) or similar tool. By employing the spanner wrench within the recesses 36, 38, the adaptor ring 20 can be securely threadedly engaged within the jar mounting attachment 16 to prevent unwanted disassociation of the parts. Thus, by tightening the ring 20 within the attachment 16 by employing a wrench, this connection will tend to remain tightly engaged during all periods of use.

The annular ring 20 defines a concentric central opening 40 of diameter suitable to receive the threaded neck 42 of a small, laboratory bottle 22 in threaded engagement therein. The adaptor ring 20 is machined or otherwise fabricated to provide interior threads 44 of suitable diameter and pitch to threadedly receive the threaded neck 42 of the laboratory bottle 22 in a structurally secure, leakproof manner. It is contemplated that the laboratory bottle 22 will be turned by hand into the interior threaded section 44 of the adaptor ring 20 for food blending purposes. Following the blending operation, the bottle 22 can be easily disengaged from the adaptor ring 20 by turning the bottle 22 relative to the adaptor ring 20 by hand. As previously set forth, the adaptor ring 20 will be securely engaged with the jar mounting attachment 16 by means of a spanner wrench (not shown) and accordingly, this joint will be made up much tighter than the hand threaded junction between the laboratory bottle 22 and the adaptor ring 20. Thus, connection and disconnection of the bottle 22 will not interfere with the wrench tightened junction between the adaptor ring 20 and the jar mounting attachment 16. When it is desired to remove the adaptor ring 20 from its association with the jar mounting attachment 16 for cleaning or for any other purpose, the spanner wrench (not shown) should be employed to disconnect the parts in conventional manner.

A resilient gasket 46 interfits between the floor 48 of the jar mounting attachment 16 and the bottom surface 50 of the adaptor ring 20 to thereby render the connection between the annular ring 20 and the jar mounting attachment 16 leakproof during the blending operations. Preferably, the gasket 46 is in the form of a flat, annular ring having a central opening 52 of size to readily receive the rotary blade 28 therethrough. As best seen in FIGS. 3 and 4, the bottom surface 50 of the annular ring 20 is provided with a depending, flat, circular lip 54. The circular lip 54 is downwardly pressed into the resilient material of the gasket 46 when the adaptor ring 20 is threaded into the jar mounting attachment 16 to compress the periphery 47 of the gasket 46. The circular lip 54 provides a positive seal in conjunction with the compressed gasket periphery 47 to prevent leakage thereabout. See FIG. 4.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a blender adaptor suitable to mount a laboratory bottle having a narrow, threaded neck upon a blender base which is equipped with a jar mounting attachment having a floor and a relatively wide diameter, internally threaded section positioned above the floor, the combination of
   A. an adaptor ring having the configuration of an annular ring including a top and a generally planar bottom and defining an inside diameter face and an outside diameter face,
      1. said inside diameter face being provided with internal threads,
      2. said internal threads being of suitable diameter and pitch to threadedly engage the said narrow bottle, threaded neck,
      3. said outside diameter face being provided with external threads,
      4. said external threads being of suitable diameter and pitch to threadedly engage the said relatively wide diameter internally threaded of said jar mounting attachment section and
   B. connection means between the adaptor ring and the jar mounting attachment to provide a leakproof connection therebetween,
      1. said connection means including a resilient gasket, said gasket being interposed between the bottom of the adaptor ring and the floor of the jar mounting attachment,
      2. the bottom of the adaptor ring being formed to provide a depending, circular downwardly facing sealing lip,
         a. said lip depending below the general plane of the bottom and terminating downwardly in a sealing surface,
         b. the entire sealing surface of the lip pressing into and compressing the resilient gasket to provide a leakproof seal when the adaptor ring is threadedly engaged into the jar mounting attachment.

2. The invention of claim 1 wherein the depending circular lip is peripherally outwardly positioned relative to the bottom of the adaptor ring.

3. The invention of claim 2 wherein the depending circular lip terminates downwardly in a flat, circular surface.

4. The invention of claim 3 wherein the flat surface contacts and peripherally compresses the gasket and wherein the adaptor bottom contacts the gasket when the adaptor ring is fully threadedly engaged within the jar mounting attachment.

* * * * *